US007047957B1

(12) United States Patent
Smith et al.

(10) Patent No.: US 7,047,957 B1
(45) Date of Patent: May 23, 2006

(54) METHOD AND APPARATUS FOR MONITORING A MULTIPLE STEP VALVE LIFTER

(75) Inventors: James Craig Smith, Farmington Hills, MI (US); Jon C. Darrow, New Hudson, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/113,598

(22) Filed: Apr. 25, 2005

(51) Int. Cl.
*F02D 41/00* (2006.01)

(52) U.S. Cl. ............ 123/673; 123/508; 123/901; 123/568.26; 73/117.3

(58) Field of Classification Search ............... 123/673, 123/90.1, 508, 568.21, 568.26, 568.27; 73/117.3, 73/118.1, 118.2
See application file for complete search history.

(56) References Cited

U.S. PATENT DOCUMENTS

| 6,530,351 | B1 | 3/2003 | Mikame | 123/90.15 |
|---|---|---|---|---|
| 6,615,782 | B1 | 9/2003 | Hendriksma et al. | 123/90.39 |
| 6,687,601 | B1 * | 2/2004 | Bale et al. | 701/108 |
| 6,722,325 | B1 | 4/2004 | Shimizu et al. | 123/90.15 |
| 6,736,096 | B1 | 5/2004 | Pierik | 123/90.16 |
| 6,763,707 | B1 | 7/2004 | Kumagai et al. | 73/117.3 |
| 6,802,302 | B1 * | 10/2004 | Li et al. | 123/568.16 |
| 6,904,752 | B1 * | 6/2005 | Foster et al. | 60/295 |
| 2003/0127063 | A1 | 7/2003 | Wang | |
| 2005/0204805 | A1 | 9/2005 | Wakahara et al. | 73/118.1 |

\* cited by examiner

*Primary Examiner*—Willis R. Wolfe
*Assistant Examiner*—Johnny H. Hoang
(74) *Attorney, Agent, or Firm*—Patrick M. Griffin

(57) ABSTRACT

A method and system for monitoring performance of an internal combustion engine equipped with individually actuated valve control mechanisms, such as a two-step finger-follower rocker-arm assembly, using a strategy that identifies cylinder-to-cylinder variations, is disclosed. The method and system preferably include monitoring engine operating conditions, based upon input from an exhaust gas sensor and engine sensors, and determining an engine operating point. Individual cylinder fueling modifiers are determined, each corresponding to one of the cylinders at the determined engine operating point, based upon input from the exhaust gas sensor. It is determined that the each individually actuated valve control mechanism is operating properly when a difference between the individual cylinder fueling modifier and a predetermined individual cylinder fueling modifier, each said modifier determined for the corresponding cylinder at the determined engine operating point, is less than a predetermined difference.

15 Claims, 2 Drawing Sheets

METHOD AND APPARATUS FOR MONITORING A MULTIPLE STEP VALVE LIFTER

TECHNICAL FIELD

This invention pertains generally to internal combustion engine control systems, and more specifically to a method for monitoring actuation of intake or exhaust valves of the internal combustion engine and diagnosing malfunctions thereof.

INCORPORATION BY REFERENCE

Applicant incorporates by reference U.S. Pat. No. 6,382, 198 B1: Individual Cylinder Air/Fuel Ratio Control Based on a Single Exhaust Gas Sensor, issued to Smith, et al., to describe a method and apparatus to monitor and control individual cylinder air/fuel ratio using a single exhaust gas sensor, and need not be fully described in detail herein.

Applicant incorporates by reference U.S. Pat. No. 6,668, 779 B2: Two Step Finger Follower Rocker Arm Assembly, issued to Hendriksma, et al., to describe an exemplary device for cooperating with high-lift and low-lift cam lobes of an engine camshaft to effect opening and closing of engine intake or exhaust valves, and need not be fully described in detail herein.

Applicant incorporates by reference U.S. Pat. No. 6,680, 607 B1: Method of Detecting Steady-State Convergence of a Signal, issued to Smith, to describe a method for detecting convergence of a data signal, and need not be fully described in detail herein.

BACKGROUND OF THE INVENTION

An internal combustion engine with multiple cylinders is subject to imbalances in air/fuel ratio between the cylinders due to unequal distribution of air, fuel, exhaust gas recirculation ('EGR') gas, and evaporative purge vapor into each cylinder. This unequal distribution is influenced by system limitations, e.g. design constraints of intake and exhaust manifolds, and by component limitations, e.g. variations in part-to-part performance and variations in performance throughout life of each part. The imbalance may vary across engine operating conditions of engine speed and load. Engine designers and calibrators use various engine control strategies to accommodate cylinder-to-cylinder air/fuel ratio imbalances to in order to develop engines and engine control systems that achieve requirements for tailpipe emissions, driveability, performance, and fuel economy. Modern engine control strategies include various hardware systems and algorithms to manage fuel control, spark timing, intake and exhaust valve lift and timing, introduction of EGR gas, and, introduction of vapor purge, to achieve the aforementioned requirements.

There is a continuing demand for improved fuel efficiency of internal combustion engines. One set of strategies being implemented to improve fuel efficiency comprises varying opening time and lift of engine intake valves to manage engine breathing under varying operating conditions including engine cold start, engine idle, partial throttle conditions, steady state operation, and high speed/load conditions.

One strategy that has been successfully implemented to identify and adjust engine control to accommodate cylinder-to-cylinder variations is referred to as individual cylinder fuel control ('ICFC'). One implementation of an ICFC strategy comprises an algorithm implemented as part of an overall engine control strategy to monitor air/fuel ratio performance of each individual cylinder using input from an exhaust gas sensor. The exemplary ICFC algorithm determines a correction factor for each cylinder that accommodates imbalance in the specific cylinder. The correction is in the form of a modification of actuation signal (e.g. base pulsewidth) to a fuel injector corresponding to each cylinder. An example of an ICFC strategy has been previously described in U.S. Pat. No. 6,382,198 B1: Individual Cylinder Air/Fuel Ratio Control Based on a Single Exhaust Gas Sensor, issued to Smith, et al.

Engine designers have implemented various technologies to accomplish improved engine breathing, including variable valve lift control ('VLC'), variable cam phasing ('VCP'), and cylinder deactivation systems. One particular technology includes reducing intake valve lift under light load conditions, to reduce engine pumping losses. Technologies implemented to reduce intake valve lift include, for example, two-step valve lifters, wherein each valve lift actuator is operable open each valve to a low-lift position or a high-lift position. Two-step valve lifter systems typically have a common actuation scheme, wherein a controller activates a common oil control valve. However, each engine valve typically has an individual two-step lifter mechanism that may malfunction. A malfunction of a single individual two-step valve lifter leads to poor driveability, deterioration of engine performance, degradation of emissions performance, engine misfire, damage to engine components, and other events that are deleterious. However, a malfunction of a single individual two-step valve lifter is difficult to detect and diagnose, due to a lack of an effective monitoring system.

Therefore, there is a need to be able to accurately diagnose when one or more variable lifters fails to operate as intended, to reduce risks of engine performance degradation and engine damage. There is a further need to accomplish this task, without addition of sensing devices with accompanying wiring harness, connectors and other hardware, to the engine.

SUMMARY OF THE INVENTION

The present invention provides an improvement over conventional engine controls by providing a system and method for monitoring performance of an internal combustion engine equipped with a plurality of individually actuated valve control mechanisms, such as a two-step finger-follower rocker-arm assembly, using a strategy that identifies cylinder-to-cylinder variations. The submitted invention comprises a method and apparatus that detects a malfunctioning individual valve control mechanism, and identifies a specific malfunctioning cylinder.

The present invention provides a method to monitor performance of an internal combustion engine having a plurality of individually actuated valve control mechanisms. The method preferably includes monitoring engine operating conditions, based upon input from at least one exhaust gas sensor and, at least one engine sensor, and determining an engine operating point. A plurality of individual cylinder fueling modifiers is determined, each corresponding to one of the cylinders at the determined engine operating point, based upon input from the exhaust gas sensor. It is determined that the individually actuated valve control mechanism is operating properly when a difference between the individual cylinder fueling modifier and a predetermined individual cylinder fueling modifier, each said modifier determined for the corresponding cylinder at the determined engine operating point, is less than a predetermined difference.

Another aspect of the invention includes the engine operating point, which comprises determining the engine is operating within a specific operating cell, the operating cell selected from one of a matrix of cells defined by the monitored engine speed and the monitored engine load.

Another aspect of the invention includes determining individual cylinder fueling modifiers, each corresponding to one of the plurality of cylinders at the determined engine operating point, based upon input from the at least one exhaust gas sensor by executing an individual cylinder fuel control algorithm. The algorithm preferably comprises monitoring the signal input from the exhaust gas oxygen sensor, synchronously with cylinder firing, and determining an air/fuel ratio for each cylinder, based upon the signal input from the exhaust gas oxygen sensor monitored synchronously with cylinder firing. A plurality of cylinder-specific air/fuel ratio imbalance signals are determined based upon air/fuel ratio for each cylinder. The plurality of individual cylinder fueling modifiers are developed, based upon the determined plurality of cylinder-specific air/fuel ratio imbalance signals.

Another aspect of the invention comprises determining the individually actuated valve control mechanism is malfunctioning when a difference between the individual cylinder fueling modifier and the predetermined individual cylinder fueling modifier, each determined for the corresponding cylinder at the determined engine operating point, is greater than the predetermined difference.

The invention further includes a system, comprising an internal combustion engine having a plurality of cylinders, and corresponding engine valves each having individually actuated control mechanisms. There is at least one exhaust gas sensor to monitor engine-out air/fuel ratio, and one or more engine sensors operable to monitor engine operation. An engine controller, operably and signally connected to the engine is operable to determine an engine operating point, based upon the sensor operable to monitor engine operation, and determine an engine-out air/fuel ratio for each of the cylinders based upon the exhaust gas sensor. The controller determines a plurality of individual cylinder fueling modifiers, based upon the determined engine-out air/fuel ratio for each of the plurality of cylinders. The controller controls actuation of the individually actuated control mechanisms. The controller is operable execute the aforementioned method in the form of one or more algorithms to determine each of the individually actuated control mechanisms is operating properly, or, alternatively that one or more of the individually actuated control mechanisms is malfunctioning.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which is described in detail and illustrated in the accompanying drawings which form a part hereof, and wherein.

DETAILED DESCRIPTION OF AN EMBODIMENT

Figure 1:
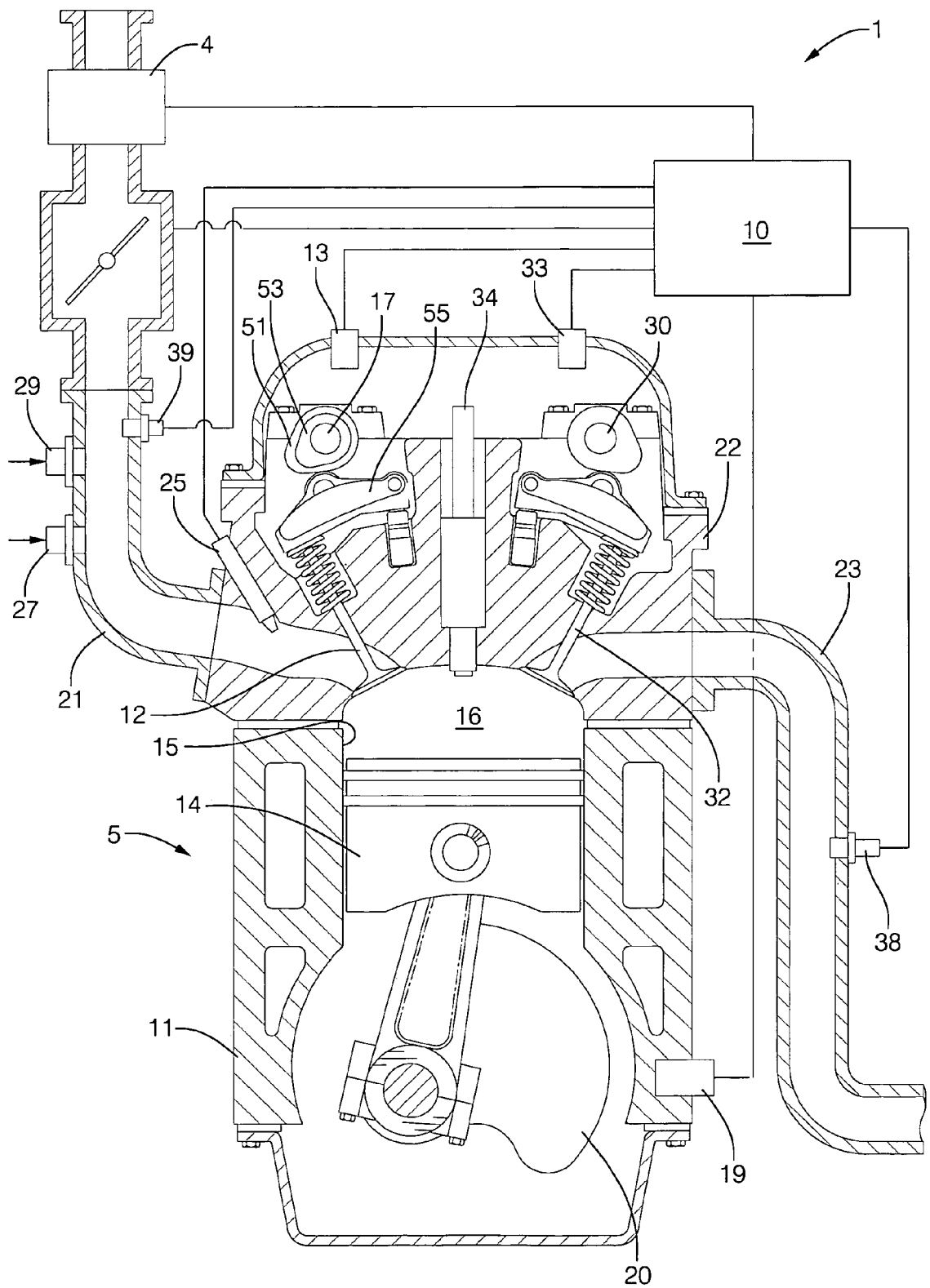
FIG. 1 is a schematic diagram, in accordance with the present invention.

Referring now to the drawings, wherein the showings are for the purpose of illustrating the invention only and not for the purpose of limiting the same, FIG. 1 shows an internal combustion engine and control system 1 which has been constructed in accordance with an embodiment of the present invention. The exemplary internal combustion engine and control system 1 comprises a spark-ignition port fuel injection engine 5 and a controller 10. The exemplary engine is equipped with a two-step intake valve control mechanism 7, operable to control opening and closing times of intake valves 12 as described hereinafter. The engine 5 includes base engine components, sensors, and output systems and devices, described in detail hereinafter. The exemplary controller 10 comprises an electronic controller signally connected to the plurality of engine sensors, operably connected to the plurality of output devices, and containing various pre-established software algorithms and predetermined calibrations. The exemplary controller 10 includes at least one microprocessor, associated memory devices, input devices for collecting and monitoring input from external analog and digital devices, and output drivers for controlling output devices. The controller 10 is operable to monitor engine operating conditions and operator inputs using the plurality of sensors, and control engine operations with the plurality of output systems and actuators, using the pre-established algorithms and calibrations that integrate information from monitored conditions and inputs. A skilled practitioner designs and implements the software algorithms and calibrations, which are executed in the electronic controller 10 to monitor the engine operating conditions and operator demands using the plurality of sensors, and control the plurality of engine actuators and systems accordingly. The software algorithms and calibrations are preferably inserted into software of the engine controller 10 during engine development, prior to start of production.

In ongoing operation of the embodiment, the engine operates in a customary four-cycle mode, wherein an intake cycle comprises intake of a combustion charge of air and fuel into the cylinder; followed by a compression cycle of the air and fuel in the cylinder; followed by a combustion event and power/expansion cycle; followed by an exhaust cycle; subsequently leading to another intake cycle. The combustion charge comprising a mixture of air and fuel is inlet through the air intake valve 12 into the combustion chamber 16, and is ignited by the spark plug 34, according to predetermined conditions. Ignition of the air/fuel mixture causes an increase in pressure in the combustion chamber 16, forcing the piston 14 to move linearly along the length of the cylinder 15, away from the head 22. The movement of the piston 14 in turn rotates the crankshaft 20. The crankshaft 20 causes the piston 14 to again move toward the head 22 after the crankshaft 20 has rotated to a furthest point of eccentricity. Engine operating point is preferably defined to comprise a combination of the engine rotational speed and engine load, and is determined by algorithms executed in the engine controller, based upon inputs from various engine sensors. The operation of the spark-ignition internal combustion engine is well known to one skilled in the art.

The exemplary engine 5 includes a plurality of cylinders 15 in engine block 11, with engine head 22 equipped with a dual overhead cam system. The head 22 includes at least one air intake valve 12 per cylinder and at least one exhaust valve 32 per cylinder. The intake valves 12 and exhaust valves 32 mechanized within the head 22 are operable to allow inlet of air and fuel into each cylinder from an intake manifold 21 and exhaust out of each cylinder to an exhaust manifold 23 when opened, upon urging by intake camshaft 17 and exhaust camshaft 30, which preferably rotate synchronously with the crankshaft 20.

Output devices of the exemplary engine control system comprise engine management control systems, including a fuel injection system, an exhaust gas recirculation ('EGR') system, an evaporative purge control system, and, an ignition system. The engine controller 10 is operable to control each of the engine management systems based upon the pre-established software algorithms and predetermined calibrations. The fuel injection system comprises a fuel rail operable to distribute pressurized fuel to a plurality of fuel injectors 25, each corresponding to each cylinder, wherein each fuel injector 25 is operable to deliver a controlled portion of fuel to the intake manifold near one of the intake valves. The EGR system (not shown) comprises an EGR valve and system (not shown), operable to control flow of a portion of exhaust gas from the exhaust manifold to the intake manifold, at inlet 27. The evaporative purge control system (not shown) preferably comprises an evaporative canister, operable to collect fuel vapors from a fuel tank, a canister purge valve, preferably a solenoid-controlled flow valve. There is associated plumbing from the canister to the canister purge valve to the intake manifold, permitting purge of vapor from the canister to the intake manifold at inlet 29. The ignition system (not shown) is operable to deliver spark energy to each of the spark plugs 34. Each is known to one skilled in the art.

The sensing devices, each signally connected to the controller 10 of the exemplary internal combustion engine 5 are operable to measure ambient conditions, various engine conditions and performance parameters, and operator inputs. The sensing devices preferably include a crank sensor 19, cam position sensors 13, 33 for the intake camshaft 17 and for the exhaust camshaft 30, exhaust gas oxygen sensor 38 located in the exhaust feedstream, a mass airflow sensor 4, and a manifold pressure sensor 39. The cam position sensors 13, 33 are operable to measure angular position of each of the corresponding camshafts 17, 30.

The head 22 of the engine includes a plurality of individually actuated intake valve control mechanisms for controlling air flow into each of the cylinders. In this embodiment, the individually actuated intake valve control mechanisms comprise the intake camshaft 17 having a plurality of paired high-lift cam lobes 51 and low-lift cam lobes 53, and operable to work in conjunction with a corresponding plurality of two-step finger-follower rocker-arm assemblies 55. An exemplary two-step finger-follower rocker-arm assembly 55 is described in U.S. Pat. No. 6,668,779 B2: Two Step Finger Follower Rocker Arm Assembly, issued to Hendriksma, et al., comprising a device for engaging either the high-lift cam lobe 51 or the low-lift cam lobe 53 of the engine intake camshaft 17 to urge and effect opening and closing of engine intake valves 12, or exhaust valves 32. In the exemplary system, regulated pressurized engine oil is supplied to each of the two-step finger-follower rocker-arm assemblies 55 to control an actuating device (not shown) contained therein. The regulated pressurized engine oil is controlled via an in-line oil control valve (not shown) that controls oil flow and is operably connected to the engine controller 10. The oil control valve is preferably a pulse-width-modulated ('PWM') control valve operable to fluidly control flow of pressurized engine oil from the engine oil pump (not shown) to the two-step finger-follower rocker-arm assemblies 55, and is controlled by the controller 10 which sends a PWM electrical signal to the oil control valve to control valve opening and corresponding flow of pressurized engine oil, based upon a predetermined algorithm and control strategy. Each paired high-lift cam lobe 51 and low-lift cam lobe 53 is assembled to engage one of the intake valves 32 using one of the two-step finger-follower rocker-arm assemblies 55.

General operation of the spark-ignition internal combustion engine is well known to one skilled in the art. In this embodiment of the engine having the individually actuated intake valve control mechanisms, the rotating engine crankshaft 20 is operably connected to the intake camshaft 17 and the exhaust camshaft, causing corresponding rotation of each of the camshafts with the crankshaft. The rotating lobes of the intake camshaft 17 engage either a first step or a second step of each of the two-step finger-follower rocker-arm assemblies, depending on whether the system is operating in a high-lift mode or a low-lift mode. The engaged first or second step of each rocker-arm assembly follows the engaged cam lobe profile, urging and opening each intake valve to a height and for a duration of time determined by the activated cam lobe and rocker-arm assembly, and design of the cam lobe.

Operating the exemplary two-step finger-follower rocker-arm assembly 55 in the high-lift mode comprises the engine controller commanding the in-line oil control valve to open fully, allowing engine oil to flow to the two-step finger-follower rocker-arm assemblies 55 at engine oil pump pressure, typically in the range of 300 to 400 kPa (45–60 psi), depending upon engine operating conditions, engine oil temperature, and other factors. The pressurized oil activates the two-step finger-follower rocker-arm assemblies 55, causing each of them to operate in high-lift mode. In the high-lift mode, each of the high-lift cam lobes 51 engages the first step of each two-step finger-follower rocker-arm assembly 55, which in turn engages the intake valve 12, thus urging the opening and closing each valve in response to rotation of the camshaft 17. Typically, each valve opens 9 to 11 millimeters (0.354 to 0.433 inches) in high-lift mode.

Operating the exemplary two-step finger-follower rocker-arm assembly 55 in the low-lift mode comprises the engine controller commanding the in-line oil control valve to regulate oil flow, restricting engine oil flow to the two-step finger-follower rocker-arm assemblies 55. The oil pressure is regulated to a range of operation of less than about 60 kPa (9 psi). This permits flow of low pressure oil for lubricating the valve galley, but not sufficient flow or pressure to activate the two-step finger-follower rocker-arm assemblies 55. This action causes each two-step finger-follower rocker-arm assembly 55 to operate in low-lift mode. In the low-lift mode, each of the low-lift cam lobes engages the second step of each two-step finger-follower rocker-arm assembly 55, which in turn engages the intake valve 12, thus opening and closing each valve in response to rotation of the camshaft. Typically, each valve opens 3 to 7 millimeters (0.118 to 0.276 inches) in low-lift mode. Design, mechanization, and operation of an internal combustion engine with two-step intake valve control are known to one skilled in the art.

Failure modes of the two-step finger-follower rocker-arm assembly 55 typically include failing to shift to operate in the low-lift mode when so commanded, failing to shift to operate in the high-lift mode when so commanded, and failing to remain in the high-lift mode or the low-lift mode. Air and fuel typically continues to flow into the engine cylinder in either failure mode, but the quantity of air flowing is affected by the specific failure, thus interfering with engine control. Therefore, individual cylinder performance and engine performance, in terms of engine air/fuel ratio and power generation, are negatively affected.

The engine controller 10 is operable to monitor an engine operating point, generally comprising a combination of engine speed and engine load. Engine speed is preferably derived from monitoring input from the crank sensor 19, as known to one skilled in the art. Engine load is preferably derived from monitoring engine intake airflow, typically based upon input from the mass airflow sensor 4, and/or input from the manifold pressure sensor 39. Engine load may instead comprise a determination of mean-effective pressure (IMEP), using input from the aforementioned sensors, and known to one skilled in the art. Determination of engine operating point is known to one skilled in the art.

Figure 2:
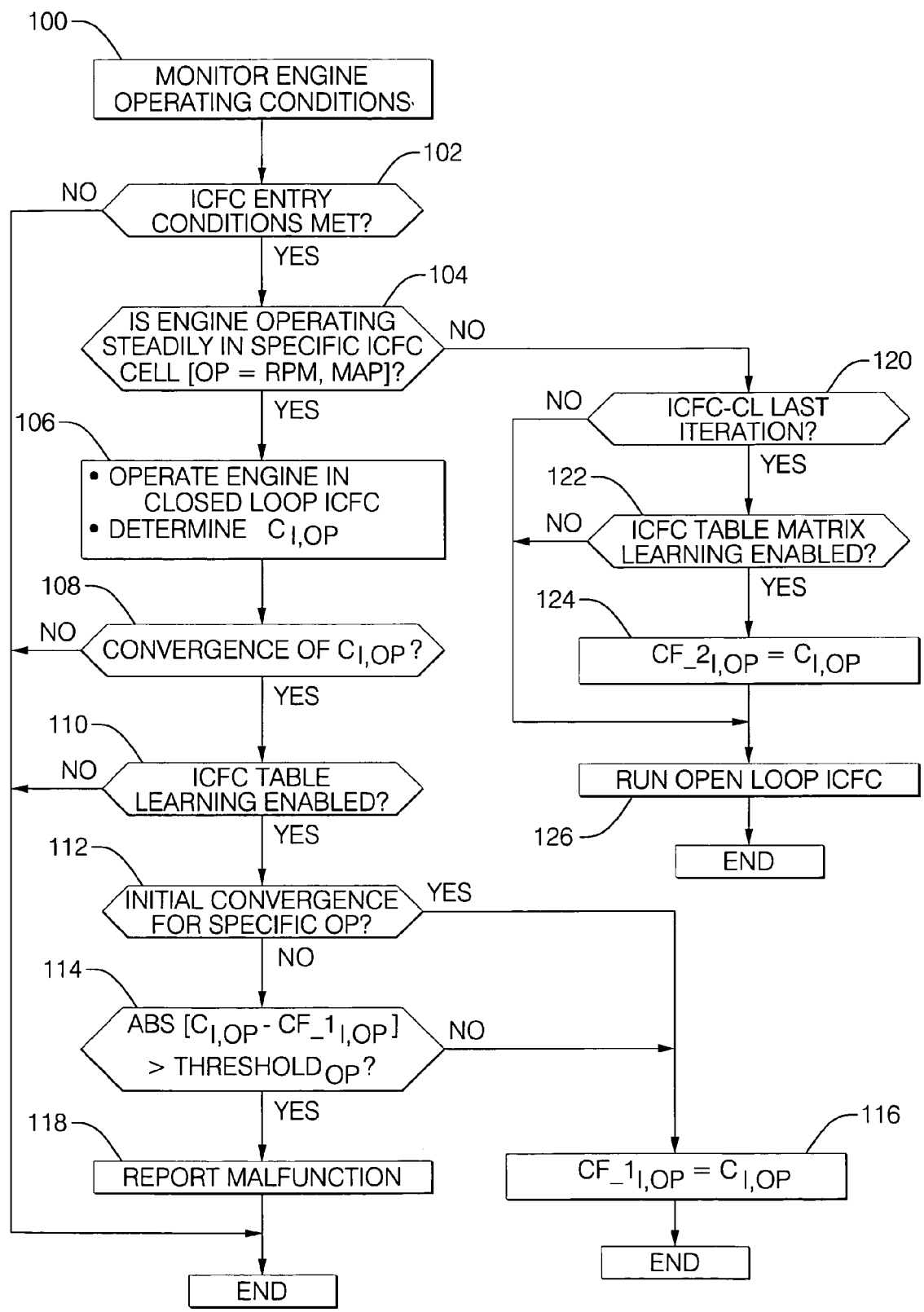
FIG. 2 is a flowchart of an algorithm, in accordance with the present invention.

Referring now to FIG. 2, a flowchart for a specific algorithm operable to determine whether each of the plurality of engine valves with individually actuated intake valve control mechanisms for controlling air flow into each of the cylinders is operating properly, is shown. In essence, the algorithm is operable to determine each individually actuated intake valve control mechanism is operating properly, based upon a time-rate change of each individual cylinder fueling modifier being less than a predetermined value for a determined engine operating point, as is shown.

The exemplary engine and control system monitors engine operating conditions, using input from the engine sensors (block 100), as detailed hereinabove, and is known to one skilled in the art. In this embodiment, the controller 10 preferably predetermines the exemplary two-step finger-follower rocker-arm assembly 55 is to be in either low-lift mode operation or high-lift mode operation for each operating point, and controls accordingly.

In operation, the algorithm determines whether conditions have been met to run an individual cylinder fuel control ('ICFC') algorithm (Block 102). These conditions typically comprise the control oxygen sensor 38 being in a warmed up operating mode, and the engine fuel control system operating in a closed loop fuel control mode. One skilled in the art is readily able to ascertain the control oxygen sensor 38 is in a warmed up operating mode, and the engine fuel control system is operating in a closed loop fuel control mode.

An exemplary algorithm for individual cylinder fuel control is described in U.S. Pat. No. 6,382,198 B1: Individual Cylinder Air/Fuel Ratio Control Based on a Single Exhaust Gas Sensor, issued to Smith, et al., which describes a method and apparatus to monitor and control individual cylinder air/fuel ratio using a single exhaust gas sensor, referred to herein as ICFC, and need not be fully described in detail herein. Determining engine-out air/fuel ratio for each of the plurality of cylinders, based upon the at least one engine-out exhaust gas sensor preferably comprises monitoring output from the exhaust gas oxygen sensor 38, synchronously with cylinder firing events, to determine ongoing air/fuel ratio for each cylinder. Resultant of executing the exemplary ICFC algorithm control comprises determining a plurality of cylinder-specific time-varying air/fuel ratio imbalance signals $\Delta\Phi1$–$\Delta\Phi4$ (for a four-cylinder engine), and developing correction factors $C_{1\text{-}OP}$–$C_{4\text{-}OP}$ for respective engine cylinders, wherein the "OP" designation refers to the respective correction factor determined for a specific engine operating point. A exemplary matrix of individual cylinder fueling modifiers or correction factors $C_{1\text{-}OP}$–$C_{4\text{-}OP}$ comprises a correction factor matrix for each engine cylinder, wherein there are cell break points for engine speed preferably occurring at: idle, and 1000, 2000, 3000, 4000, 5000 revolutions per minute (RPM); and engine load breakpoints preferably occurring at 20%, 40%, 60%, 80%, and 100% of full load, or maximum IMEP. A matrix in this configuration contains thirty five speed/load cells (or operating point cells) for each cylinder, wherein each cell contains a fueling correction factor for a specific cylinder at the specific speed/load operating point, as described above. In operation, the engine controller preferably determines an amount of fuel to deliver to a cylinder, in terms of fuel injector open time (or pulsewidth). The controller selects an appropriate correction factor from the matrix of correction factors, based upon a determined speed/load operating point. The selected correction factor is used to adjust the open time (or pulsewidth) for each injector, preferably as a multiplier. The controller 10 is operable to periodically update each correction factor, based upon ongoing engine operation and performance. The engine controller 10 uses correction factors $C_{1\text{-}OP}$–$C_{4\text{-}OP}$ as an element of a feedforward fuel control algorithm to reduce air/fuel ratio imbalance in each cylinder while preserving overall, or average, air/fuel ratio established by the engine's closed loop control system. Adjustment to fuel injector pulsewidth for each corresponding individual cylinder acts to improve engine performance and reduce air/fuel ratio imbalances between cylinders, as part of ongoing engine fuel control. Creation, execution and use of matrices within electronic controllers is known to one skilled in the art.

In the exemplary embodiment two correction factor matrices are created, wherein the first correction factor matrix, CF_1, contains a plurality of correction factors ongoingly used by the engine controller 10 to compensate engine fueling in a feedforward mode, and is analogous to the correction factor matrix described hereinabove with reference to ongoing individual cylinder fuel control. The second correction factor matrix, CF_2, preferably comprises a matrix of the same form as the first matrix, having the same number of operating point cells, and containing correction factors as described hereinafter. Each correction factor from second correction factor matrix, CF_2 preferably ongoingly used by the engine controller 10 to compensate engine fueling in a feedback mode. Engine fuel control using feedback and feedforward control algorithms is known to one skilled in the art, and not detailed herein.

The resultant of the ICFC algorithm in this embodiment comprises a first matrix containing individual cylinder fueling modifiers or correction factors $CF\_1_{I\text{-}OP}$ calculated for each of the cylinders, wherein CF_1 designates a correction factor for the first matrix, and wherein the "I" subscript designates specific cylinder (1–N, wherein N=number of cylinders) and the "OP" subscript designates the engine operating point. Each correction factor $CF\_1_{I\text{-}OP}$ comprises a fully converged correction factor. The first matrix of individual cylinder fueling modifiers comprises a correction factor matrix for each engine cylinder, with cell break points for engine speed preferably occurring at: idle, and 1000, 2000, 3000, 4000, 5000 revolutions per minute (RPM); and engine load breakpoints preferably occurring at 20%, 40%, 60%, 80%, and 100% of full load. When the first matrix is in this configuration, a matrix containing thirty five speed/load cells for each cylinder is generated, with each cell containing a fueling correction factor, as described above. Creation and execution of matrices within algorithms is known to one skilled in the art.

A second matrix of individual cylinder fueling modifiers or correction factors $CF\_2_{I\text{-}OP}$ is provided for as part of the algorithm, and comprises a duplicated form of the first matrix. The individual cylinder fueling modifiers or correction factors $CF\_2_{I\text{-}OP}$ of the second matrix preferably comprise correction factors determined during ongoing operation of the engine in a specific operating point cell of the matrix, while the engine is operating within the cell. Therefore, the $CF\_2_{I,OP}$ correction factors represent an indication of the current operating conditions of each cylinder, and are useful to evaluate whether a malfunction has occurred in any cylinder, at that operating point, as described hereinafter.

When the ICFC entry conditions are met, (block 102) it is determined whether the engine has been steadily operating within a specific speed/load cell, i.e. operating within the specific cell for greater than about one second (Block 104). When this is the case, the closed loop ICFC algorithm is executed, and a plurality of correction factors $C_{I,OP}$ are calculated, with one correction factor for each of the cylinders at that operating point (Block 106). The engine controller 10 preferably operates the fuel control system in a closed-loop ICFC mode, executing both feedback and feedforward control. It is then determined whether there has been convergence of the specific correction factor $C_{I,OP}$ (Block 108). Convergence is preferably determined by executing an algorithm that embodies a method for detecting convergence of a data signal. This method is described in U.S. Pat. No. 6,680,607 B1: Method of Detecting Steady-State Convergence of a Signal, issued to Smith, which is incorporated by reference herein, and need not be fully described in detail herein. Convergence as described in the referenced patent is preferably determined when a filtered version of an input signal falls below a threshold for a predetermined amount of time. When convergence occurs (block 108), it is next determined whether learning is enabled for the specific operating point in the ICFC table (block 110). In this embodiment, learning is enabled for the specific operating point in the ICFC table unless flowrate of exhaust gas recirculation ('EGR') system exceeds a volumetric flowrate in excess of about 10% fraction of cylinder volume, and is determined at least in part based upon cylinder combustion stability limits determined during engine development. The learning is further enabled for the specific operating point in the ICFC table unless flowrate of evaporative canister purge system exceeds a volumetric flowrate in excess of about 10% fraction of cylinder volume, typically converted into a value measured in liters per minute. The learning may also be disabled when other engine control factors affecting air/fuel ratio are outside of normal bounds of operation, which is determined during engine development. The EGR flowrate or fraction, and canister purge flowrate are determinable based upon engine manifold design, EGR system design, and purge system design operation which affect intake manifold distribution and cylinder-to-cylinder maldistribution.

When learning is enabled for the specific operating point in the ICFC table, it is determined whether the specific operating point cell in the matrix has been previously written to, i.e. whether the controller has previously determined a correction factor $CF\_1_{I,OP}$ for the cell (block 112). When the controller has not previously determined a correction factor for the cell, the initial correction factor $C_{I,OP}$ becomes the correction factor $CF\_1_{I,OP}$ for the cell, in the first matrix (block 116), and is subsequently used by the controller for engine feedback fuel control. When the controller has previously determined a correction factor, $CF\_1_{I,OP}$, for the cell (contained in the first matrix), an absolute difference between the initial correction factor and the first matrix correction factor is calculated, $ABS[C_{I,O}-CF\_1_{I,OP}]$, and compared to a threshold value (block 114). Note that this absolute difference between the initial correction factor and the first matrix correction factor is calculated for each of the cylinders, so, for example, there are four calculations for a four cylinder engine. The threshold value preferably comprises a difference in the range of four percent between the initial correction factor and the first matrix correction factor. When the absolute difference for one of the cylinders, I, exceeds the threshold (block 114), the algorithm indicates the potential existence of a malfunction in the exemplary two-step finger-follower rocker-arm assembly 55 for that cylinder, I (block 118). When the absolute difference does not exceed the threshold for any of the cylinders (block 114), the initial correction factor $C_{I,OP}$ becomes the first matrix correction factor $CF\_1_{I,OP}$ for the cell (block 116), which is subsequently used by the controller 10 for engine feedback fuel control.

When the engine has not been steadily operating within a specific speed/load cell, i.e. not operating within the specific cell for greater than about one second (Block 104), the algorithm determines whether the controller was operating the fuel control system in a closed-loop ICFC mode, executing both feedback and feedforward control during the previous iteration of the algorithm 100 (block 120). It is next determined whether learning to the second matrix was enabled (block 122). When this is the case, the initial correction factor $C_{I,OP}$, calculated during the previous iteration of the algorithm 100, becomes the second matrix correction factor $CF\_2_{I-OP}$ for the cell (block 124), and is subsequently used by the controller in operation of open-loop individual cylinder fuel control (block 126). When the controller did not previously operate in closed-loop ICFC mode (block 120), or convergence has not occurred (block 122), the algorithm directs the controller to operate in open-loop ICFC mode (block 126), without updating the first matrix.

The invention has been described with specific reference to the preferred embodiments and modifications thereto. The embodiment described hereinabove details a system wherein the individually actuated intake valve control mechanisms for controlling air flow into each of the cylinders comprises the air intake system with the two-step intake camshaft including the two-step finger-follower rocker-arm assembly 55. It is understood that the invention may comprise alternative embodiments wherein there is a plurality of individually actuated control mechanisms, each operable to control engine valves (intake and/or exhaust) for a single cylinder. One embodiment includes the exhaust system with the two-step exhaust camshaft including the two-step finger-follower rocker-arm assembly 55. A second alternate embodiment includes a cylinder deactivation system. A third alternate embodiment includes electronically controlled engine valves, wherein there is a controller-activated solenoid device operable to open and close each engine valve. Further modifications and alterations may occur to others upon reading and understanding the specification. It is intended to include all such modifications and alterations insofar as they come within the scope of the invention.

What is claimed is:

1. A method to monitor performance of an internal combustion engine having a plurality of individually actuated valve control mechanisms, comprising:

monitoring engine operating conditions, based upon input from at least one exhaust gas sensor and, at least one engine sensor;

determining an engine operating point, based upon the monitored engine operating conditions;

determining a plurality of individual cylinder fueling modifiers, each corresponding to one of the plurality of cylinders at the determined engine operating point, based upon input from the at least one exhaust gas sensor; and, determining each individually actuated valve control mechanism is operating properly, when: a difference between the individual cylinder fueling modifier and a predetermined individual cylinder fueling modifier, each said modifier determined for the corresponding cylinder at the determined engine operating point, is less than a predetermined difference.

2. The method of claim 1, wherein monitoring engine operating conditions, based upon input from the at least one exhaust gas sensor and, the at least one engine sensor comprises: monitoring engine speed based upon input from a crank sensor, monitoring engine load based upon a measure of intake airflow, and, monitoring engine exhaust gas based upon a signal input from at least one exhaust gas oxygen sensor.

3. The method of claim 2, wherein determining an engine operating point, based upon the monitored engine operating conditions comprises: determining the engine is operating within a specific operating cell, the operating cell selected from one of a matrix of cells defined by the monitored engine speed and the monitored engine load.

4. The method of claim 3, wherein determining a plurality of individual cylinder fueling modifiers, each corresponding to one of the plurality of cylinders at the determined engine operating point, based upon input from the at least one exhaust gas sensor comprises: executing an individual cylinder fuel control algorithm, the algorithm comprising:

monitoring the signal input from the exhaust gas oxygen sensor, synchronously with cylinder firing;

determining an air/fuel ratio for each cylinder, based upon the signal input from the exhaust gas oxygen sensor monitored synchronously with cylinder firing;

determining a plurality of cylinder-specific air/fuel ratio imbalance signals, based upon air/fuel ratio for each cylinder; and, developing the plurality of individual cylinder fueling modifiers, based upon the determined plurality of cylinder-specific air/fuel ratio imbalance signals.

5. The method of claim 1, further comprising determining at least one individually actuated valve control mechanism is malfunctioning when: a difference between the individual cylinder fueling modifier and the predetermined individual cylinder fueling modifier, each determined for the corresponding cylinder at the determined engine operating point, is greater than the predetermined difference.

6. A system for monitoring performance of an internal combustion engine having a plurality of individually actuated valve control mechanisms, comprising:

the internal combustion engine, comprising:

a plurality of cylinders, each cylinder having at least one intake valve and at least one exhaust valve; each of the at least one intake valves operably connected to an individually actuated valve control mechanism;

at least one exhaust gas sensor operable to monitor an exhaust gas feedstream of the engine;

at least one engine sensor operable to monitor engine operation; and, an engine controller, operably connected to the plurality of individually actuated valve control mechanisms, signally connected to the at least one exhaust gas sensor, and, signally connected to the at least one engine sensor;

the controller operable to:

monitor engine operating conditions, based upon input from the at least one exhaust gas sensor and, the at least one engine sensor;

determine an engine operating point, based upon the monitored engine operating conditions;

determine a plurality of individual cylinder fueling modifiers, each corresponding to one of the plurality of cylinders at the determined engine operating point, based upon input from the at least one exhaust gas sensor; and, determine each individually actuated valve control mechanism is operating properly, when: a difference between the individual cylinder fueling modifier and a predetermined individual cylinder fueling modifier, each said modifier determined for the corresponding cylinder at the determined engine operating point, is less than a predetermined difference.

7. The system of claim 6, further comprising: the controller operable to determine at least one individually actuated valve control mechanism is malfunctioning when: a difference between the individual cylinder fueling modifier and the predetermined individual cylinder fueling modifier, each determined for the corresponding cylinder at the determined engine operating point, is greater than the predetermined difference.

8. The system of claim 6, wherein the at least one exhaust gas sensor operable to monitor the exhaust gas feedstream of the engine comprises an exhaust gas oxygen sensor operable to monitor the exhaust gas feedstream.

9. The system of claim 6, wherein the at least one engine sensor operable to monitor engine operation comprises: a crank sensor operable to monitor engine speed.

10. The system of claim 9, wherein the at least one engine sensor operable to monitor engine operation further comprises: a mass airflow sensor operable to monitor airflow intake into the engine.

11. The system of claim 10, wherein the controller operable to determine an engine operating point, based upon the monitored engine operating conditions comprises the controller operable to determine engine speed based upon input from the crank sensor, and operable to determine engine load based upon input from the mass airflow sensor.

12. The system of claim 9, wherein the at least one engine sensor operable to monitor engine operation further comprises: a manifold absolute pressure sensor.

13. The system of claim 12, wherein the controller operable to determine an engine operating point, based upon the monitored engine operating conditions comprises the controller operable to determine engine speed based upon input from the crank sensor, and operable to determine engine load based upon input from the manifold absolute pressure sensor.

14. The system of claim 6, wherein the individually actuated valve control mechanism comprises a two-step finger-follower rocker-arm assembly.

15. The system of claim 14, wherein the controller operable to control actuation mode of each individually actuated valve control mechanism comprises the controller operable to control each two-step finger-follower rocker-arm assembly to a low-step actuation mode and a high-step actuation mode.

* * * * *